United States Patent [19]

Holstein

[11] 4,170,826
[45] Oct. 16, 1979

[54] LONGITUDINAL MEASURING DEVICE WITH LONGITUDINALLY DISPLACEABLE SCALE

[75] Inventor: Siegbert Holstein, Stein, Fed. Rep. of Germany

[73] Assignee: Dr. Johannes Heidenhain GmbH, Traunreut, Fed. Rep. of Germany

[21] Appl. No.: 883,790

[22] Filed: Mar. 6, 1978

[30] Foreign Application Priority Data

Mar. 22, 1977 [DE] Fed. Rep. of Germany ....... 2712421

[51] Int. Cl.$^2$ .............................................. G01B 11/04
[52] U.S. Cl. ................................. 33/125 C; 33/125 T; 356/373
[58] Field of Search ............... 356/169, 170, 172, 373, 356/374; 250/237 G; 33/125 R, 125 C, 125 A, 125 T

[56] References Cited

U.S. PATENT DOCUMENTS

| | | | |
|---|---|---|---|
| 2,795,992 | 6/1957 | Deh Chang Tao | 356/170 |
| 3,316,646 | 5/1967 | Novey | 33/125 R |
| 3,387,139 | 6/1968 | Gerard et al. | 356/170 |
| 3,816,002 | 6/1974 | Wieg | 33/125 T |
| 4,060,903 | 12/1977 | Ernst | 33/125 R |

*Primary Examiner*—Richard E. Aegerter
*Assistant Examiner*—John W. Shepperd
*Attorney, Agent, or Firm*—Hume, Clement, Brinks, Willian & Olds, Ltd.

[57] ABSTRACT

A longitudinal measuring device is disclosed which includes a flexible scale mounted inside a tubular member. The tubular member defines a groove having overhanging flanges on each side of the groove and the scale is positioned inside the groove. The width of the scale is chosen to be wider than the separation between the overhanging flanges, and the flanges serve to retain the scale in the groove in a longitudinally displaceable manner without applying distorting forces to the scale. Both the scale and the tubular member are independently mounted to a mounting surface such as a machine component, and the scale is mounted in such a manner that the separation between the ends of the scale can be expanded without dismounting the scale from the machine component.

15 Claims, 3 Drawing Figures

LONGITUDINAL MEASURING DEVICE WITH LONGITUDINALLY DISPLACEABLE SCALE

BACKGROUND OF THE INVENTION

The present invention relates to an encapsulated longitudinal measuring device which is particularly adapted for measuring large displacements. This device comprises a flexible scale which is mounted in a longitudinally displaceable manner in a hollow tubular member. This tubular member also encloses a sensing unit which moves along the scale and measures its position on the scale. Generally, an evaluation and display unit is also included to process the position information generated by the sensing unit This measuring installation may be used to measure a relative movement, for example, the relative movement between two machine components such as a machine bed and a machine carriage. The scale and the scanning unit are generally high precision components which are protected from environmental influences by the tubular member which surrounds them.

In high precision measuring systems the selection of the component materials used in a particular device is highly important, especially since materials with different expansion coefficients often must be combined. Ideally, it would often be desirable to use materials having identical or similar expansion coefficients, however, cost considerations often make this impractical. Most frequently a measuring system will combine machine components made from grey castings, a hollow tubular member of aluminum and a scale made of steel or glass.

Certain measuring devices of the prior art connect the measuring scale to the basic body of the device in a longitudinally displaceable manner, for example, by way of a highly elastic intermediate layer. The scale is thereby isolated in some measure from changes in length due to bending of the tubular member (German Patent No. 1,176,382). Moreover, a measuring device is shown in U.S. Pat. No. 3,816,002, in which a housing is fastened to the carriage of a machine tool. The scale is fixed within the housing at one end, while the other end of the scale is positioned in a kind of tensioning apparatus within the housing. This tensioning apparatus operates to compensate by way of a spring for the temperature-dependent longitudinal changes of the housing. As a result of this arrangement the scale remains relatively uninfluenced by temperature-dependent longitudinal changes of the housing. One of the disadvantages of the last-named arrangement, however, is that the scale is tensioned freely between suspension points at both of its ends in the interior of the housing. Vibrations associated with the operation of machine tools can act on the scale and cause it to vibrate. In some cases this vibration may cause errors and even damage to the scanning unit. Therefore, this method is in general applicable only conditionally and then for only relatively small measuring lengths.

SUMMARY OF THE INVENTION

The present invention is directed to a longitudinal measuring device which reduces the distorting influences exerted on the scale due to thermal expansion to negligibly small effects, in spite of the fact that materials with varying expansion coefficients are used.

This measuring device includes a hollow tubular member. A flexible scale is form-lockingly mounted in the tubular member in such a way that the scale is displaceable along the measuring direction and is isolated from many distorting forces. A sensing unit is seated at guide surfaces in the interior of the tubular member and the flexible scale is fixed directly to a machine component by way of fastening installations.

In the preferred embodiment of the measuring device according to this invention the flexible scale is adjustably fastened at one end to the machine component by means of a correcting installation.

One important advantage of this invention is that the tubular member can be built up from smaller sections while the scale extends the full length of the measured range. This feature is particularly advantageous in measuring devices adapted for large measuring lengths. The invention, together with further objects and attendant advantages, will be best understood by reference to the following detailed description taken in conjunction with the appended drawings.

DETAILED DESCRIPTION OF A PREFERRED EMBODIMENT

Figure 1:
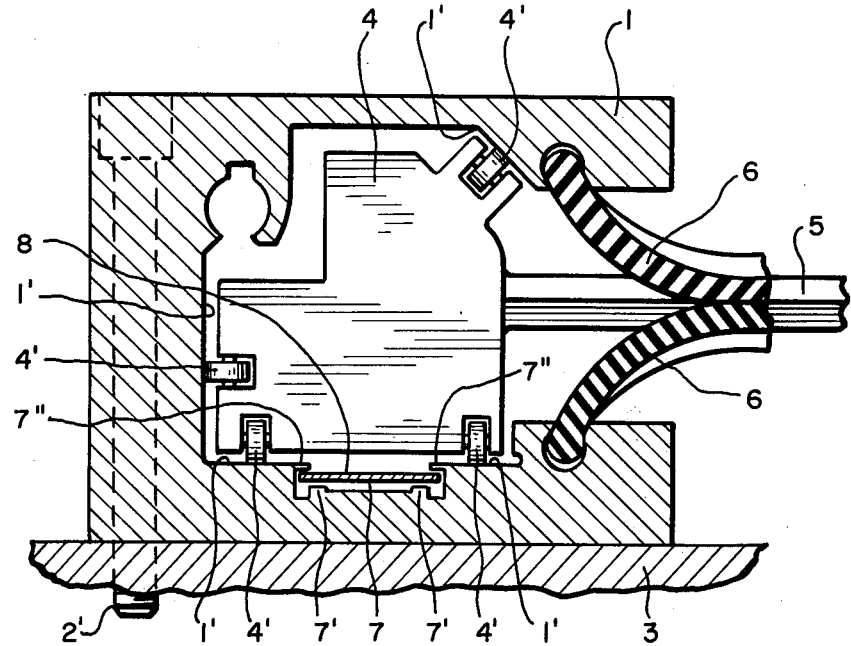
FIG. 1 is a cross-sectional view of a simplified representation of a preferred embodiment of the measuring device of this invention.

Referring now to the drawings, FIG. 1 shows a rigid and stable tubular housing member 1 which is fastened by screws and pins 2 to a machine component 3. A sensing carriage 4 is positioned movably in the measuring direction in the interior of the tubular member 1. Said sensing carriage 4 is seated by way of rollers 4' at guiding surfaces 1' in the tubular member 1. The sensing carriage 4 is coupled by way of an entrainment means 5 of sword-like cross-section to a second machine component, not shown, which carries out the longitudinal movement to be measured. Sealing lips 6, which contact the entrainment means 5 as shown, substantially prevent penetration of dirt and spraying water into the interior of the measuring device. A scale 8 is embedded in a groove 7 defined by the tubular member 1. In the measuring device according to the invention the scale 8 consists of a thin flexible steel tape provided with a high-precision graduation which is sensed by way of the incident light method by an evaluation unit not shown. Said evaluation unit is mounted on the sensing carriage 4. The groove 7 is provided with contact surfaces 7' for the scale 8. Above the contact surfaces 7' the scale 8 is embraced by a protruding flange 7''. The contact surfaces 7' and the flange 7'' are spaced so precisely with respect to the scale 8 that the scale 8 is displaceable along the measuring direction but it only shows a negligibly small lateral movement in the groove 7 in the directions transverse to the measuring direction.

Figure 2:
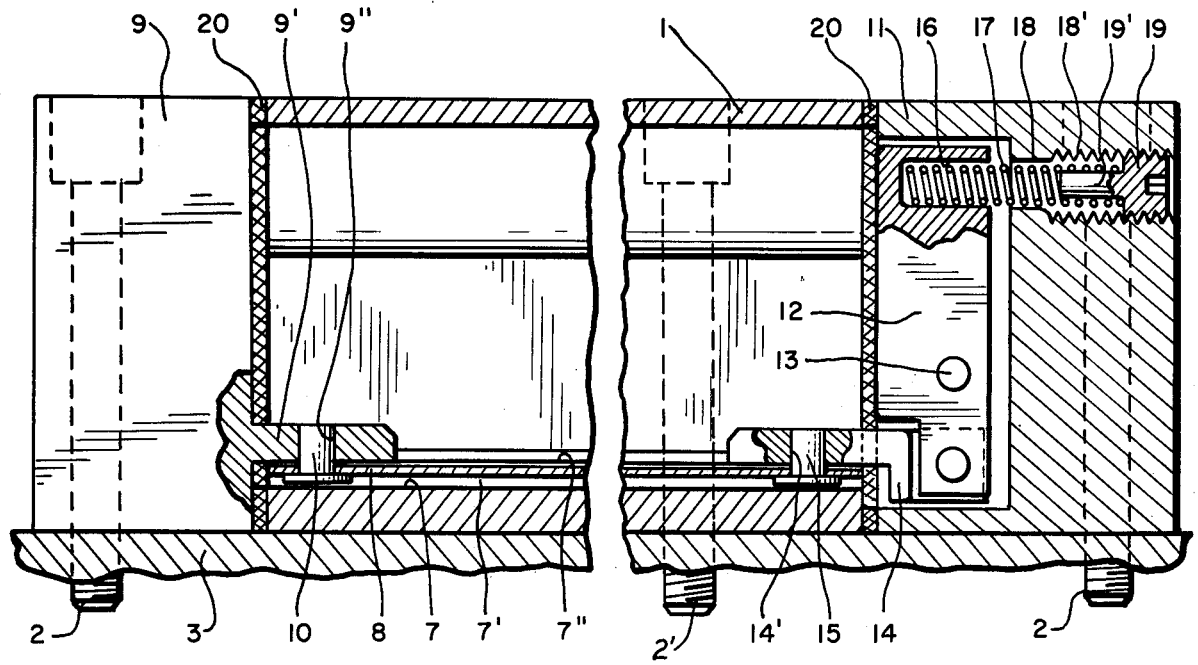
FIG. 2 is a longitudinal view of the device of FIG. 1 in partial cutaway.

FIG. 2 shows a portion of the measuring device of FIG. 1 in highly simplified form. The measuring carriage 4 is not shown here, as it does not contribute toward further elucidation of the invention. A measuring tape holding means 9 is fixedly connected to the machine component 3, for example, by screws and pins. The measuring tape holding means 9 is provided with a support arm 9' which defines a perforation 9''. A flat-headed pin is fastened in this perforation 9'' and secures the measuring tape 8 to the support arm 9'. A second measuring tape holding means 11 likewise is fixedly mounted on the machine component 3 by screws and pins. In this embodiment, the measuring tape holding means 11 functions as a corrective device which may be used to expand the measuring tape 8. A lever 12 is positioned in a recess 11' of the measuring tape holding means 11 and is rotatable about a shaft 13 within certain limits. A support arm 14 is articulated at one end of the lever 12. The measuring tape 8 is secured to the support arm 14 by a flat-headed pin 15 which is fitted into a perforation 14' defined in the support arm 14. The lever 12 is provided at its other end with a blind hole 16 which accommodates a pressure spring 17. The pressure spring 17 protrudes into a perforation 18 which is present at the measuring tape holding means 11 and bears a thread 18' which is accessible from the outside. An adjustment screw 19 is provided with a peg 19' which centers the spring 17. When the adjustment screw 19 is advanced the spring 17 exerts an increased force on the lever 12 which tends to rotate the lever 12 about the shaft 13 and thereby expand the measuring tape 8. With the aid of this corrective installation it is possible to precisely adjust the measuring device of this invention to reduce measurement errors.

Usually, such measuring systems are mass-produced and the machine tools on which these systems are used vary slightly. Therefore, the scales 8 are made slightly smaller than the theoretical measurement and then gauged appropriately for a particular machine according to its record of defects, generally with the aid of a laser interferometer. Defects occuring eventually due to wear of the machine tool guides can be compensated by altering the length of the scale 8 with the aid of the arrangement shown.

In this embodiment the tubular member 1 is sectioned approximately at the level of the scale 8 along its longitudinal side. The groove 7 whose supporting surfaces 7' support the scale 7 is shown below the scale 8. The flange 7" surrounding the scale 8 is placed above the scale 8. The tubular member 1 is fastened separately to the machine component 3 by fastening members, not shown. With the aid of elastic seals 20 the tubular member 1 is sealed against the measuring tape holding means 9 and 11.

Figure 3:
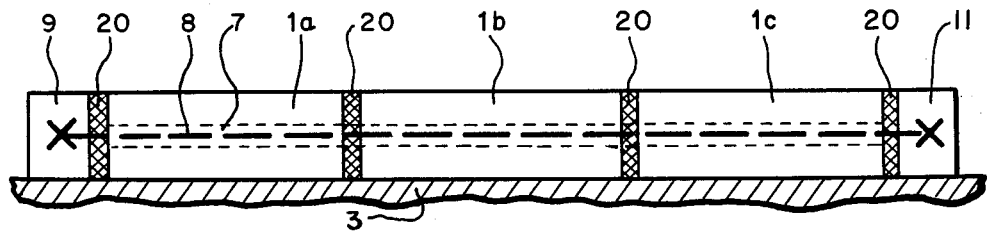
FIG. 3 is an elevational view of the measuring device of FIG. 1.

FIG. 3 schematically shows how the invention can be utilized in measuring devices having a large measuring length. In this embodiment the tubular member 1 is built up of partial sections 1a, 1b, and 1c which are adjusted and fixed on a machine component 3. The length of these sections 1a, 1b and 1c should be chosen to faciliate fabrication. One elastic seal 20 between each of the partial sections 1a, 1b, 1c performs a sealing function and also compensates for the temperature-dependent longitudinal changes of the partial sections 1a, 1b, 1c. Following the mounting of the partial sections 1a, 1b, 1c, the measuring tape 8 is pulled into the groove 7 of the partial sections 1a, 1b, 1c, and fastened to the measuring tape holding means 9. The measuring tape holding means 9 and 11 are likewise fixed to the machine component 3 in a known manner. With the aid of the corrective installation 11 the measuring tape 8 is gauged on the machine in order to reduce the measurement error. Because the tubular member 1 is built up of several partial sections, there are several junctions in the guide surface 4'. The sensing unit 4 should be designed to travel over these junctions smoothly so as not to interfere with the measurement readings. The measuring scale 8, on the other hand, is a single piece tape which is free from any junctions along the length of the scale.

Of course, it should be understood that various changes and modifications to the preferred embodiment described herein will be apparent to those skilled in the art. For instance, alternate configurations may be used for the measuring tape holding means 9, 11, the tubular member 1, or other components of the invention. Such changes and modifications can be made without departing from the scope of the present invention and without diminishing its attendant advantages. It is, therefore, intended that such changes and modifications be covered by the following claims.

I claim:

1. In an encapsulated longitudinal measuring device including a flexible measuring scale defining first and second end sections and extending along a longitudinal direction, a tubular member surrounding at least a portion of the measuring scale and secured to a first object, and a scanning unit guided along the scale by the tubular member and coupled to a second object relatively moveable with respect to the first object, the improvement comprising:

means for securing the first and second end sections of the measuring scale directly to the first object; and means, included in the tubular member, for embracing the measuring scale inside the tubular member in a longitudinally displaceable manner, said embracing means operative to restrict lateral movement of the scale substantially without applying distorting or clamping forces thereto such that the scale is moveable longitudinally in the embracing means.

2. The measuring device of claim 1 wherein the securing means includes means for selectively expanding the length of the measuring scale.

3. The measuring device of claim 1 further comprising means for isolating the tubular member from the securing means such that forces associated with thermal expansion of the tubular member are substantially prevented from acting on the securing means.

4. The measuring device of claim 1 wherein the scale is fabricated without joints along the length of the scale, the tubular member comprises a plurality of partial sections joined end to end, and a resilient sealing member is interposed between adjacent partial sections.

5. An encapsulated longitudinal measuring device comprising:

a tubular member;

a groove defined in the tubular member having a predetermined depth;

a flange formed in the tubular member adjacent the groove, said flange operating to narrow the groove to a predetermined width over a portion of the predetermined depth of the groove;

a flexible measuring scale defining first and second end sections, the scale being disposed in the groove so as to be displaceable along the length of the groove and having a width greater than the predetermined width;

means for mounting the tubular element to a first object;

means for securing the first and second end sections of the scale to the first object ;

means for adjusting the separation between the first and second end sections of the scale in the groove; and a scanning unit connected to a second object, relatively movable with respect to the first object, said scanning unit guided along the scale by the tubular member.

6. An encapsulated measuring device comprising:

a measuring scale which defines first and second end sections and extends along a longitudinal direction;

a tubular member which substantially surrounds at least a portion of the scale and is secured to a first object;

means included in the tubular member for embracing the scale at a plurality of points along the length of the scale to restrict lateral movement of the scale substantially without applying distorting or clamping forces to the scale such that the scale is substantially free to move longitudinally with respect to the tubular member to substantially isolate the scale from forces associated with longitudinal thermal expansion of the tubular housing;

means for securing the first and second end sections of the scale to the first object, said securing means isolated from the tubular member substantially to prevent forces associated with longitudinal thermal expansion of the tubular member from being transmitted to the securing means; and a scanning unit guided by the tubular member along the scale and connected to a second object, relatively movable with respect to the first object.

7. The device of claim 6 wherein the embracing means includes a flanged groove sized to receive the scale and to restrict the lateral movement of the scale.

8. The device of claim 6 wherein the scale is flexible and the securing means includes means for selectively expanding the length of the scale.

9. The device of claim 6 wherein the tubular member comprises first and second sections and a resilient seal member is positioned between said sections.

10. In an encapsulated longitudinal measuring device including a measuring scale which defines first and second end sections and extends along a longitudinal direction, a tubular member which substantially surrounds at least a portion of the scale, and a scanning unit guided along the scale by the tubular member and coupled to a first object, the improvement comprising:

means for securing the first and second end sections of the scale to a second object, relatively moveable with respect to the first object, said securing means isolated from the tubular member substantially to prevent forces associated with changes in the longitudinal dimension of the tubular member from being transmitted to the securing means;

means for mounting the measuring scale inside the tubular member in a longitudinally displaceable manner to substantially isolate the scale from forces associated with changes in the longitudinal dimension of the tubular member, said mounting means including means for restraining the lateral movement of the scale at intermediate portions of the scale; and means for attaching the tubular member to the second object independently of the securing means.

11. The improvement of claim 10 wherein the mounting means includes a flanged groove in the tubular member wherein the groove is sized to receive the scale and to restrict the lateral movement of the scale.

12. The improvement of claim 10 wherein the scale is flexible and the securing means includes means for selectively expanding the length of the scale.

13. The improvement of claim 10 wherein the tubular member comprises first and second sections and a resilient seal member is positioned between said sections.

14. An encapsulated longitudinal measuring instrument comprising:

a tubular member;

means for securing the tubular member to a first object;

a groove having a predetermined depth defined in the tubular member;

a flange formed in the tubular member adjacent the groove, said flange extending over a portion of the groove to narrow at least a portion of the groove to a predetermined width;

a measuring scale defining first and second end sections and having a width greater than the predetermined width, said scale disposed in the groove and displaceable along the length of the groove;

means for securing the first and second end sections of the scale to the first object independently of the tubular member, said securing means isolated from the tubular member to substantially prevent thermal expansion of the tubular member from being transmitted to the securing means;

means, included in the securing means, for adjusting the separation between the first and second end sections of the scale; and a scanning unit guided by the tubular member along the scale and coupled to a second object, relatively movable with respect to the first object.

15. The instrument of claim 14 wherein the tubular member comprises first and second sections and a resilient seal member is positioned between said sections.

* * * * *